US005517034A

United States Patent [19]

Neyens et al.

[11] Patent Number: 5,517,034
[45] Date of Patent: May 14, 1996

[54] RADIATION IMAGE RECORDING AND REPRODUCING METHOD

[75] Inventors: Ludo Neyens, Kontich; Paul Leblans, Berchem, both of Belgium

[73] Assignee: Agfa-Gevaert, N.V., Mortsel, Belgium

[21] Appl. No.: 70,929

[22] Filed: Jun. 4, 1993

[30] Foreign Application Priority Data

Jul. 2, 1992 [EP] European Pat. Off. .............. 92201996

[51] Int. Cl.$^6$ ............................ G01N 23/04; C09K 11/46
[52] U.S. Cl. .................. 250/484.4; 252/301.4 H
[58] Field of Search ................... 250/484.4, 581; 252/301.4 H

[56] References Cited

U.S. PATENT DOCUMENTS 5,034,607  7/1991  McAllister et al. ............. 250/484.4
5,138,171  8/1992  Tecotzky et al. ............... 252/301.4 H
5,140,159  8/1992  Blasse et al. .................. 250/581

Primary Examiner—Paul M. Dzierzynski
Assistant Examiner—Richard Hanig
Attorney, Agent, or Firm—Breiner & Breiner

[57] ABSTRACT

A stimulable phosphor member for recording and reproducing a penetrating radiation image is disclosed, comprising at least one phosphor layer containing in a binder a mixture of two or more individually prepared divalent europium doped bariumfluorohalide phosphors at least one of which contains (a) co-dopant(s) which co-determine(s) the character of the stimulation spectrum of the co-doped phosphor, whereby the method of recording and reproducing said penetrating radiation image comprises the steps of (i) causing stimulable storage phosphors to absorb said penetrating radiation having passed through an object or emitted by an object and to store energy of said penetrating radiation, (ii) stimulating said phosphors with stimulating light to release at least a part of said stored energy as fluorescent stimulation light and (iii) detecting said stimulation light.

12 Claims, 2 Drawing Sheets

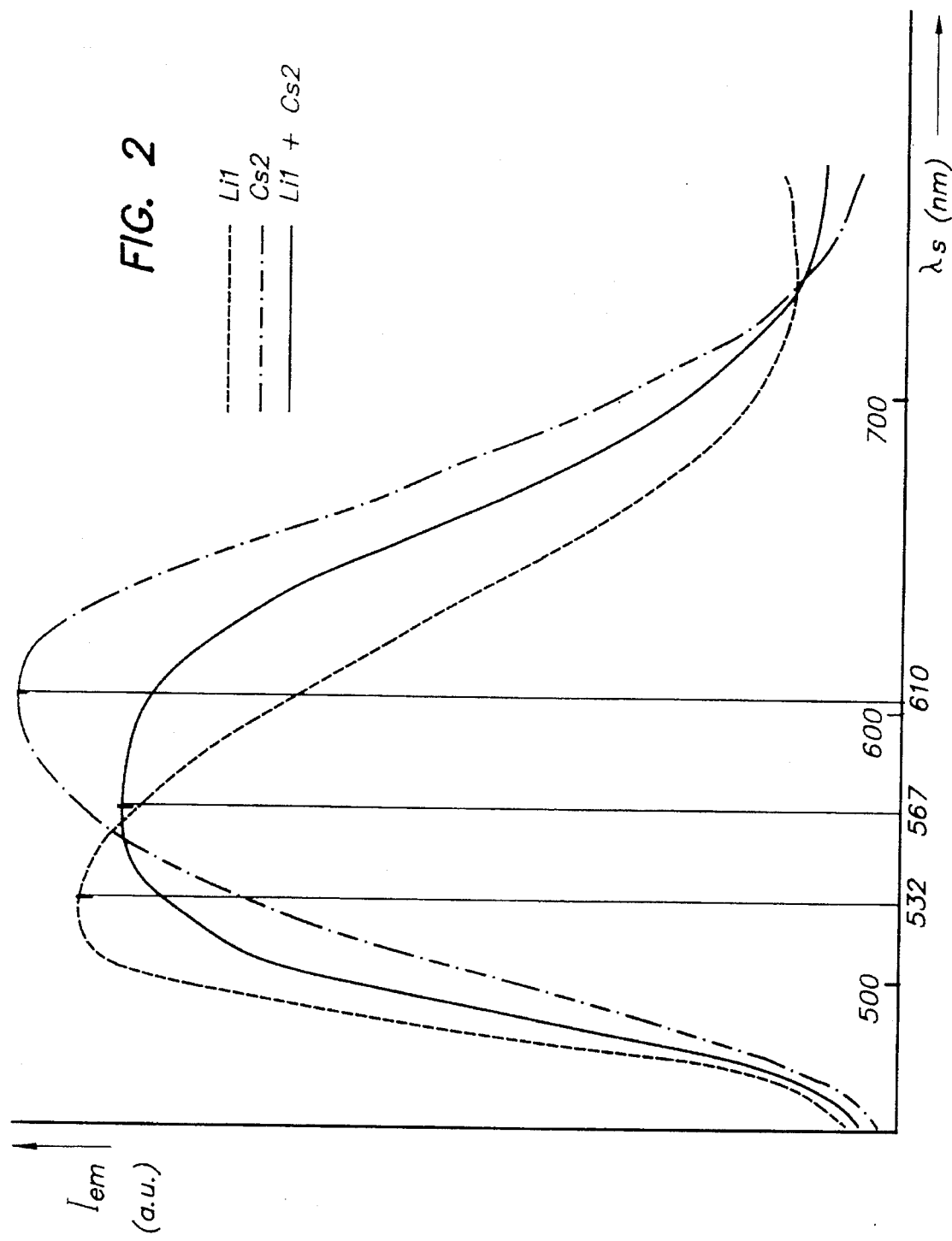

RADIATION IMAGE RECORDING AND REPRODUCING METHOD

DESCRIPTION

1. Field of the Invention

The present invention relates to a method for recording and reproducing a pattern of penetrating radiation using a storage phosphor panel of improved reproducibility of stimulation-characteristics, especially for stimulation with visible and near infrared radiation.

2. Background of the Invention

In radiography the interior of objects is reproduced by means of penetrating radiation, which is high energy radiation also known as ionizing radiation belonging to the class of X-rays, y-rays and high-energy elementary particle radiation, e.g. β-rays, electron beam or neutron radiation. For the conversion of penetrating radiation into visible light and/or ultraviolet radiation luminescent substances, called phosphors, are used.

In a conventional radiographic system an X-ray radiograph is obtained by X-rays transmitted imagewise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays.

In practice the light emitted imagewise by said screen irradiates a contacting photographic silver halide emulsion layer film which after exposure is developed to form therein a silver image in conformity with the X-ray image.

More recently as described e.g. in U.S. Pat. No. 3,859,527 an X-ray recording system has been developed wherein photostimulable storage phosphors are used having in addition to their immediate light emission (prompt emission) on X-ray irradiation the property to store temporarily a large part of the X-ray energy. Said energy is set free by photostimulation in the form of fluorescent light different in wavelength from the light used in the photostimulation. In said X-ray recording system the light emitted on photostimulation is detected photoelectronically and transformed into sequential electrical signals.

The basic constituents of such X-ray imaging system operating with a photostimulable storage phosphor are an imaging sensor containing said phosphor in particulate form normally in a plate or panel, which temporarily stores the X-ray energy pattern, a scanning laser beam for photostimulation, a photoelectronic light detector providing analogue signals that are converted subsequently into digital time-series signals, normally a digital image processor which manipulates the image digitally, a signal recorder, e.g. magnetic disk or tape, and an image recorder for modulated light exposure of a photographic film or an electronic signal display unit, e.g. cathode-ray tube. A survey of lasers useful in the read-out of photostimulable latent fluorescent images is given in the periodical Research Disclosure Volume 308 No.117 p.991,1989.

Of special interest in the application of said image recording and reproducing method are barium fluorohalide phosphors e.g. those identified in U.S. Pat. No. 4,239,968.

According to U.S. Pat. No. 4,239,968 a method is claimed for recording and reproducing a radiation image comprising the steps of (i) causing a visible ray- or infrared ray-stimulable phosphor to absorb a radiation passing through an object, (ii) stimulating said phosphor with stimulation rays selected from visible rays and infrared rays to release the energy of the radiation stored therein as fluorescent light, characterized in that said phosphor is at least one phosphor selected from the group of alkaline earth metal fluorohalide phosphors of a particular formula.

From the stimulation spectrum of said phosphors can be learned that said kind of phosphor has high sensitivity to stimulation light of a He-Ne laser beam (633 nm) but poor photostimulability below 500 nm. The stimulated light (fluorescent light) is situated in the wavelength range of 350 to 450 nm with a peak at about 390 nm (ref. the periodical Radiology, Sept. 1983, p.834.).

It can be learned from said U.S. Pat. No. 4,239,968 that it is desirable to use a visible ray-stimulable phosphor rather than an infra-red ray-stimulable phosphor because the traps of an infra-red-stimulable phosphor are shallower than these of the visible ray-stimulable phosphor and accordingly the radiation image storage panel Comprising the infra-red ray-stimulable phosphor exhibits a relatively rapid dark-decay (fading).

For solving that problem it is desirable as explained in U.S. Pat. No. 4,239,968 to use a photostimulable storage phosphor which has traps as deep as possible to avoid fading and to use for emptying said traps light rays having substantially higher photon energy (rays of short wavelength).

Attempts have been made to formulate phosphor compositions showing a stimulation spectrum in which the emission intensity at the stimulation wavelength of 500 nm is higher than the emission intensity at the stimulation wavelength of 600 nm. A suitable phosphor for said purpose is described in U.S. Pat. No. 4,535,238 in the form of a divalent europium activated barium fluorobromide phosphor having the bromine-containing portion stoichiometrically in excess of the fluorine. According to U.S. Pat. No. 4,535,238 the photostimulation of the phosphor can proceed-effectively with light in the wavelength range of 400 to 550 nm.

The use of shorter wavelength light in the photostimulation of phosphor panels containing phosphor particles dispersed in a binder is in favour of image-sharpness since the diffraction of stimulation light in the phosphor-binder layer containing dispersed phosphor particles acting as a kind of grating will decrease with decreasing wavelength as has been described in the EP-Application 533 234, filed on Sep. 17, 1991.

In this EP-Application 533 234 a process is described to prepare europium-doped alkaline earth metal fluorobromide phosphors, wherein fluorine is present in a larger atom% than bromine, and which have a stimulation spectrum that is clearly shifted to the shorter wavelength region. As is apparent from the examples in this EP Application 533 234 the ultimately obtained phosphor composition determines the optimum wavelength for its photostimulation and, therefore, the sensitivity of the phosphor in a specific scanning system containing a scanning light source emitting light in a narrow wavelength region. This means that it is highly desirable to produce phosphors with a constant composition and, therefore, with a constant stimulation spectrum for use in storage phosphor panels. This may be difficult to achieve when co-dopants that influence the position of the stimulation spectrum e.g. samarium or an alkali metal are added to the raw mix of base materials in small amounts as prescribed in EP-Application 533 234. It is difficult to achieve sufficiently homogeneous mixing of these small amounts in the raw mix, especially when large quantities of raw mix should be prepared. Also, due to the small amounts of co-dopants, the errors made upon weighing the amounts are relatively large and also the loss of a small amount upon the preparation of the raw mix, may seriously affect the concentration of the co-dopant in the final product. The co-dopants used to shift the stimulation spectrum according to EP-Application 533 234 are volatile at the firing temperature, and therefore, small fluctuations of the firing temperature in the production of the phosphors may cause fluctuations of the concentration of the fluxing agent in the final product. For all these reasons it is difficult to produce storage phosphors with constant properties when co-dopants are used to produce a change in the stimulation spectrum of divalent europium-doped bariumfluorohalide phosphors. A small change in the phosphor composition may make the whole system deviate from its desired optimum characteristics, especially its sensitivity, as the choice of the stimulating light source has to be considered as a constant parameter in the whole system. Said irreproducibility in phosphor composition may lead to a big loss of material, since quite a large amount of non-optimum material may result from the production process.

OBJECTS OF THE INVENTION

It is a first object of the present invention to provide a mixture of photostimulable bariumfluorohalide storage phosphors having optimally reproducible photostimulability with respect to a chosen stimulating radiation.

It is another object of the present invention to provide a method of reading out a penetrating radiation image by photostimulating a storage phosphor member containing an energy pattern of absorbed radiation, wherein the release of stimulation light is optimized.

Other objects and advantages of the present invention will become apparent from the description given hereinafter.

SUMMARY OF THE INVENTION

The above objects are accomplished by the application of a method of recording and reproducing a penetrating radiation image comprising the steps of:

(i) causing stimulable storage phosphors to absorb said penetrating radiation having passed through an object or emitted by an object and to store energy of said penetrating radiation, (ii) stimulating said phosphors with stimulating light to release at least a part of said stored energy as fluorescent light and (iii) detecting said stimulation light, characterised in that said phosphors consist of a mixture of two or more individually prepared divalent europium doped bariumfluorohalide phosphors at least one of which contains (a) co-dopant(s) which co-determine(s) the character of the stimulation spectrum of the co-doped phosphor.

BRIEF DESCRIPTION OF THE DRAWINGS

FIG. 2 is the stimulation spectra of phosphor of example 2.

DETAILED DESCRIPTION OF THE INVENTION

Figure 1:
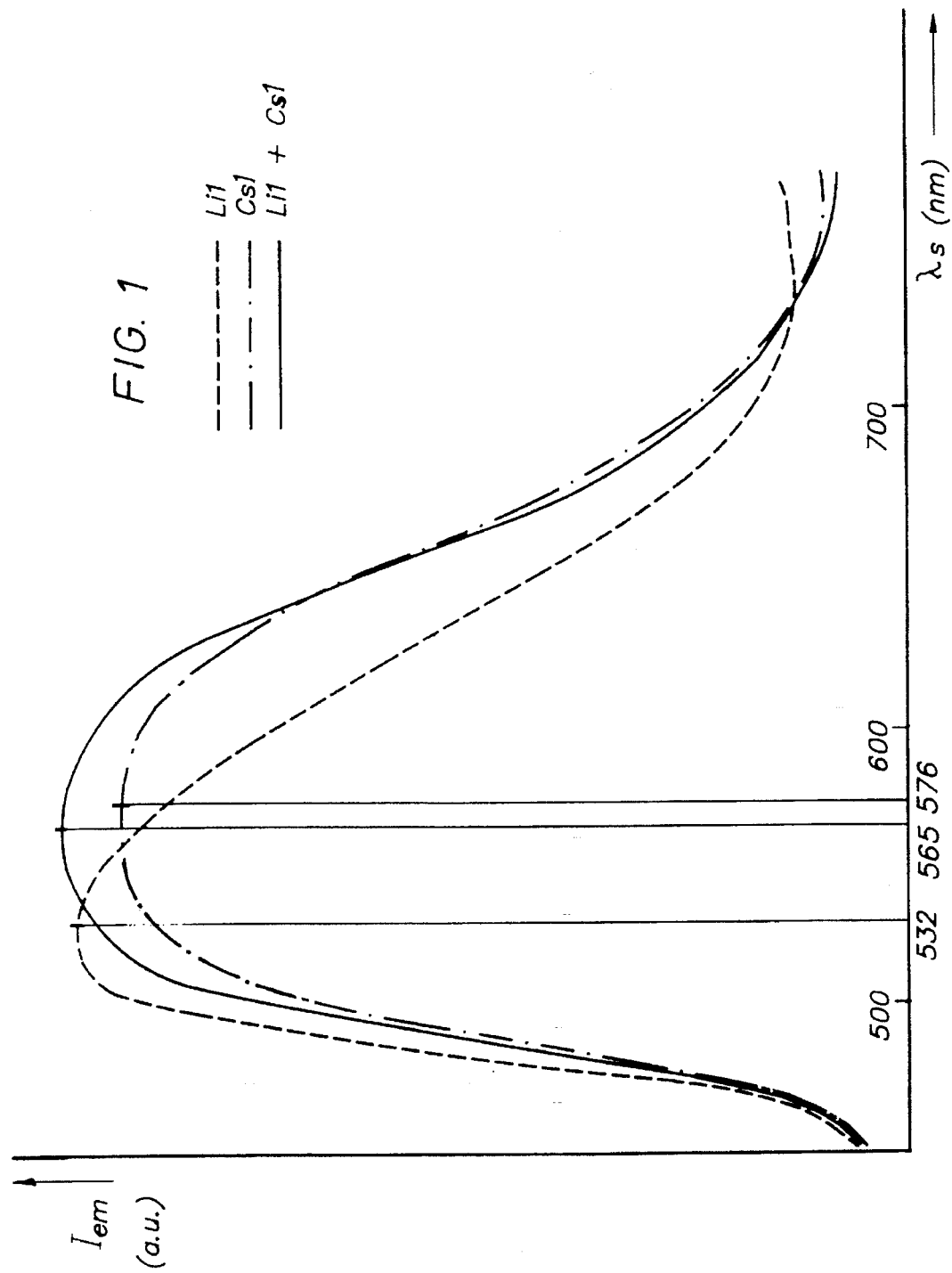
FIG. 1 is the stimulation spectra of phosphor of example 1.

According to one embodiment said phosphor mixture preferably consists of a divalent europium activated barium fluorohalide phosphor prepared in the presence of at least one co-dopant having an influence on the character of the stimulation spectrum and a divalent europium activated bariumfluorohalide phosphor prepared in the absence of such co-dopant.

According to another embodiment a mixture is prepared consisting of at least two divalent europium activated bariumfluorohalide phosphors, each of which has been prepared in the presence of at least one co-dopant having an influence on the character of the stimulation spectrum, the co-dopants for each being different from each other in chemical composition.

The differently prepared europium activated barium fluorohalide phosphors are preferably prepared from the same raw mix to which the co-dopants are added.

In a preferred embodiment use was made of lithium carbonate and cesium chloride respectively. Differences in the radius of the respective cations are responsible for the variations in the disturbance of the crystal lattice parameters of the stimulable phoshors, which in their turn are decisive for the position of the maximum in the stimulation spectrum. In practice a maximum in the stimulation spectrum for the lithium fluxed stimulable europium activated barium fluorohalide phosphor can be found between 520 and 550 nm, whereas for the cesium fluxed phosphor it is situated between 570 and 630 nm. Maxima for the stimulation spectra of said phosphors after making a mixture thereof can be found at intermediate wavelengths. The stimulation spectrum of said mixture is further characterized in that the emission intensity at 500 nm stimulation is always lower than the emission intensity at 600 nm.

In the divalent europium-doped bariumfluorohalide phosphors according to the present invention the bromine-containing portion may be (1) stoichiometrically equivalent with the fluorine portion as e.g. in the phosphor described in claim 1 of U.S. Pat. No. 4,239,968,
(2) may be substoichiometrically present with respect to the fluorine portion as described e.g. in published EP-A 0 021 342 or 0 345 904 and U.S. Pat. No. 4,587,036, or
(3) may be superstoichiometrically present with respect to the fluorine portion as described e.g. in claim 1 of U.S. Pat. No. 4,535,237.

Divalent europium activated barium fluorobromide phosphors suitable for use according to the present invention have been described in EP-Application 533 236.

Preferred photostimulable phosphors according to that application contain samarium with respect to barium in an atom percent in the range of $10^{-3}$ to 10 at. %.

Other preferred photostimulable phosphors according to that application contain an alkali metal selected from the group consisting of Li, Na, K, Rb and Cs, with respect to barium in an atom percent in the range of $10^{-2}$ to 1 at. %.

Other preferred photostimulable phosphors according to that application contain an alkaline earth metal selected from the group consisting of Sr, Mg and Ca with respect to barium in an atom percent in the range of $10^{-1}$ to 20 at. %. From said alkaline earth metals Sr is most preferred for increasing the X-ray conversion efficiency of the phosphor. Therefore in a preferred embodiment strontium is recommended to be present in combination with barium and fluorine stoichiometrically in larger atom % than bromine alone or bromine combined with chlorine and/or iodine.

Other preferred photostimulable phosphors according to that application contain a rare earth metal selected from the group consisting of Ce, Pr, Nd, Gd, Tb, Dy, Ho, Er, Tm, Yb and Lu with respect to barium in an atom percent in the range of $10^{-3}$ to $10^{-1}$ at. %. From said rare earth metals Gd is preferred for obtaining a shift of the maximum of the photostimulation spectrum of the phosphor to the shorter wavelengths.

The preferred phosphors of that application referred to hereinbefore are also preferred for use in the present invention.

Still other preferred photostimulable phosphors for use according to the present invention contain a trivalent metal selected from the group consisting of Al, Ga, In, Tl, Sb, Bi and Y with respect to barium in an atom percent in the range of $10^{-1}$ to 10 at. %. From said trivalent metals Bi is preferred for obtaining a shift of the maximum of the photostimulation spectrum of the phosphor to the shorter wavelengths.

Preferred phosphors for use according to said application and this invention are phosphors wherein fluorine is present stoichiometrically in a larger atom % than bromine taken alone or bromine combined with chlorine and/or iodine, e.g. fluorine is present in 3 to 12 atom % in excess over bromine or bromine combined with chlorine and/or iodine.

Particularly interesting phosphors according to the present invention are within the scope of the following empirical formula (I):

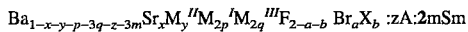

wherein:
X is at least one halogen selected from the group consisting of Cl and I,
$M^I$ is at least one alkali metal selected from the group consisting of Li, Na, K, Rb and Cs;
$M^{II}$ is at least one alkaline earth metal selected from the group consisting of Ca and Mg;
$M^{III}$ is at least one metal selected from the group consisting of Al, Ga, In, Tl, Sb, Bi, Y or a trivalent lanthanide, e.g. La, Ce, Pr, Nd, Gd, Tb, Dy, Ho, Er, Tm, Yb, and Lu;
x is in the range $0.12 \leq x \leq 0.55$
a is a number satisfying the conditions of $0.85 \leq a \leq 0.96$ when x is $0.17 \leq x \leq 0.55$ and $0.90 \leq a \leq 0.96$ when x is $0.12 \leq x \leq 0.17$;
y is in the range $0 \leq y \leq 10^{-1}$;
b is in the range $0 \leq b \leq 0.15$;
p is in the range $0 \leq p \leq 0.3$;
q is in the range $0 \leq q \leq 0.1$;
z is in the range $10^{-6} \leq z \leq 10^{-2}$;
m is in the range $0 \leq m \leq 10^{-1}$, and
A is $Eu^{2+}$.

In preferred phosphors according to said empirical formula (I) "a" is in the range of $0.90 \leq a \leq 0.96$.

In preferred phosphors according to said empirical formula (I) p is in the range of $10^{-4} \leq p \leq 10^{-1}$ and the preferred alkali metal for shifting the maximum of the stimulation spectrum of the phosphor to the shorter wavelengths in combination with samarium is Na or Rb.

In preferred phosphors according to said empirical formula (I) containing strontium in combination with barium the value "x" is preferably in the range $0.12 \leq x \leq 0.17$ when $0.90 \leq a \leq 0.96$, and $0.55 \leq x \leq 0.17$ when $0.85 \leq a \leq 0.96$.

In preferred phosphors according to said empirical formula (I) $M^{III}$ is Gd, and "q" is in the range $10^{-5} \leq q \leq 10^{-3}$.

In preferred phosphors according to said empirical formula (I) "m" is in $10^{-4} \leq m \leq 10^{-2}$ and "z" is in the range $10^{-6} \leq z \leq 10^{-1}$.

Other photostimulable phosphors for use in this invention have been described in EU Patent Application 533 233. In accordance with said invention a photostimulable phosphor is provided which is within the scope of the following empirical formula (I):

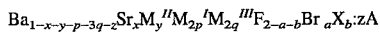

wherein:
X is at least one halogen selected from the group consisting of Cl and I,
$M^I$ is at least one alkali metal selected from the group consisting of Li Na, K, Rb and Cs;
$M^{II}$ is at least one alkaline earth metal selected from the group consisting of Ca and Mg;
$M^{III}$ is at least one metal selected from the group consisting of Al, Ga, In, Tl, Sb, Bi, Y or a trivalent lanthanide, e.g. La, Ce, Pr, Nd, Sm, Gd, Tb, Dy, Ho, Er, Tm, Yb and Lu;
x is in the range $0.12 \leq x \leq 0.55$
a is a number satisfying the conditions of $0.85 \leq a \leq 0.96$ when x is $0.17 \leq x \leq 0.55$ and $0.90 \leq a \leq 0.96$ when x is $0.12 \leq x \leq 0.17$;
y is in the range $0 \leq y \leq 0.10$;
b is in the range $0 \leq b \leq 0.15$;
p is in the range $0 \leq p \leq 0.3$;
q is in the range $0 \leq q < 0.1$;
z is in the range $10^{-6} \leq z \leq 10^{-2}$ and
A is $Eu^{2+}$.

In preferred phosphors according to said empirical formula (I) fluorine is present stoichiometrically in at least 4 to 10 atom % larger than bromine taken alone or bromine combined with chlorine, so that "a" is preferably in the range of $0.90 \leq a \leq 0.96$.

In preferred phosphors for use according to the present application p is in the range $10^{-4} \leq p \leq 10^{-1}$ and the preferred alkali metal halides for shifting the maximum of the stimulation spectrum of the phosphor to the shorter wavelengths are fluorides.

In preferred phosphors according to the said application containing strontium in combination with barium the value "x" is preferably in the range $0.12 \leq x \leq 0.17$ when $0.90 \leq a \leq 0.96$, and $0.17 \leq x \leq 0.55$ when $0.85 \leq a \leq 0.96$.

In preferred phosphors for use according to said application $Me^{III}$ is samarium and/or Gd, and "q" is in the range $10^{-5} \leq q \leq 10^{-2}$.

In preferred phosphors for use according to said invention "z" is in the range $10^{-6} \leq z \leq 10^{-1}$.

Still other divalent europium activated barium fluorobromide phosphors suitable for use according to the present invention have been described in EP-Application 533 234.

Preferred phosphors for use according to that application are phosphors wherein fluorine is present in 3 to 12 atom % in excess over bromine or bromine combined with chlorine and/or iodine.

Divalent europium activated barium fluorobromide phosphors suitable for use according to that application are within the scope of an empirical formula wherein (1) a minor part of the barium (less than 50 atom %) is replaced optionally by at least one metal selected from the group consisting of an alkali metal, alkaline earth metal other than barium, trivalent metal selected from the group consisting of Al, Ga, In, Tl, Sb, Bi, Y, the rare earth metals Ce, Pr, Nd, Gd, Tb, Dy, Ho, Er, Tm, Yb and Lu, and (2) a minor part (less than 50 atom %) of the bromine is replaced by chlorine, and/or iodine.

The prepared phosphors of that application referred to hereinbefore are also preferred for use in the present invention.

Photostimulable phosphors suitable for use according to the present invention are prepared preferably by using as starting materials in the firing:
(1) barium fluoride;
(2) ammonium bromide;
(3) optionally barium halide (except for barium fluoride), (4) an alkali metal compound, e.g. lithium fluoride, lithium chloride, lithium bromide, lithium iodide, lithium hydroxide or oxide or lithium carbonate, sodium fluoride, sodium chloride, sodium bromide, potassium fluoride, rubidium fluoride, cesium chloride, cesium fluoride, etc.

(5) a strontium halide, optionally in admixture with a calcium and/or magnesium halide;

(6) optionally a $M^{III}$ compound, e.g. halide or oxide wherein $M^{III}$ has the definition given above, preferably $M^{III}$ is Gd;

(7) at least one A containing compound selected from the group consisting of europium halide, europium oxide, europium nitrate and europium sulphate, preferably $EuF_3$ that is reduced to yield $Eu^{2+}$ ions during firing.

(8) a co-dopant compound, e.g. as halide or oxide of Sm or Bi.

In this formulation, the alkali metal compound is often called a "fluxing agent", which may be built in the phosphor crystal structure.

The difference between "fluxing agents" and "co-dopants" is not always very significant. Fluxing agents are well-known from literature, not only in the preparation of stimulable phosphors used in image storage panels, but also from production procedures of spontaneously emitting phosphors used in intensifying screens. The flux can be thought of as a fluid in which the various component parts of the phosphor react to form a phosphor. During the firing step it is often beneficial to use a flux which usually is in the liquid state at the elevated temperatures commonly used.

The difference between "fluxes" and "activators" is not always clear as under certain conditions fluxes may be essential promotors of luminescence as is e.g. the case with oxygen-containing fluxes that are essential in the preparation of efficient long-persisting alkaline-earth sulphide or selenide phosphors.

As described in "An introduction to luminescence of solids" by H. W. Leverenz, John Wiley and Sons, Inc., New York, 1950, the inclusion of fluxes is beneficial in certain phosphors intended for excitation by low-energy photons, while otherwise it is often necessary to avoid fluxes when high efficiency is required upon excitation by high-energy particles, especially when the fluxes tend to become occluded as luminescence-inert material or when they react with other phosphor ingredients to form inert vitreous phases.

Generally used fluxes are alkali or alkaline-earth metal halides, borates and sulphates, which are added in proportions of the order of 1% by weight of the batch prior to crystallization, that can be removed from the reaction mixture by washing provided that the base material is not soluble in water. In some cases it is even impossible to use certain organic solvents as e.g. methyl alcohol dissolving magnesium sulphate and glycerine dissolving some of the alkali halides.

As already described in "An introduction to luminescence of solids" by H. W. Leverenz, John Wiley and Sons, Inc., New York, 1950, the resulting effect of using fluxes like strontium sulphate, calcium fluoride or lithium fluoride consists in a shift of the maximum intensity of the stimulation and the emission peaks for stimulable phosphors.

It has been established experimentally that by making mixtures of at least two divalent europium activated barium fluorohalide phosphors, differing in that they have been prepared in the presence of different co-dopants it is possible to produce phosphor batches having far more constant luminescence properties. The differently prepared europium activated barium fluorohalide phosphors are prepared preferably from the same raw mix and differ in their co-dopants.

Mixing of different stimulable phosphors produced with different co-dopants in varying ratios makes it possible to get a very reproducible emission intensity from said phoshors upon stimulation provided that the stimulating light source remains the same. In practice this result has been reached by making a raw mix of the starting materials, adding different fluxes and/or co-dopants to different portions of said raw mix and firing said portions separately to obtain phosphor batches with different stimulation spectra. Said co-dopants are preferably added as salts of alkali metals as e.g. Li, Cs, Rb, Na or K or as oxides or salts of samarium or bismuth.

As a consequence a first advantage is the constancy of the properties of the storage panel in which a mixture of the stimulable phosphors is incorporated which is guaranteed as the production can be optimized more easily than in the presence of only one stimulable phosphor which has been prepared from a raw mix, in the presence of one or more fluxing agents showing fluctuating properties in the manufacturing due to slight differences in weighing amounts, mixing procedures, applied temperatures and more generally heating procedures and manutention factors.

A mixture of two or more individually prepared divalent europium activated barium fluorohalide phosphors wherein at least one of which has been prepared in the presence of at least one co-dopant that influences the position of the stimulation spectrum and at least one of which has been prepared in the absence of such co-dopant or wherein at least two have been prepared in the presence of at least one such co-dopant, the co-dopants for these two being different from each other in chemical composition may be incorporated into a stimulable phosphor member comprising a layer wherein said mixture is incorporated.

Another stimulable phosphor member may be produced comprising a layer containing a mixture consisting of a divalent europium activated barium fluorohalide phosphor prepared in the absence of a co-dopant having an influence on the position of the stimulation spectrum and a divalent europium activated bariumfluorohalide phosphor prepared in the presence of at least one such co-dopant.

Most preferably it has to be recommended to incorporate a mixture consisting of at least two divalent europium activated bariumfluorohalide phosphors, each of which has been prepared in the presence of at least one co-dopant having an influence on the position of the stimulation spectrum, the co-dopants for each being different from each other in chemical composition in a stimulable phosphor member comprising a layer containing said mixture.

The spectra obtained from said stimulable phosphor members comprising a layer containing said mixtures of stimulable phosphors can be made far more reproducible by experimental optimization of the ratio of the amounts of different phosphors mixed on the basis of the position of their stimulation spectrum. In practical mixtures made of stimulable phosphors according to the present invention, amounts of said stimulable phosphors should be mixed in such ratios as to obtain blends with highly reproducible stimulation spectra.

The broadening of the obtained stimulation spectra is a second advantage resulting from this procedure of making blends in that the storage panel in which the stimulable phosphors are incorporated is sensitive to a broad region of stimulation wavelengths in the visible range of the wavelength spectrum.

As a consequence the storage panel comprising a layer with the phosphor blends described hereinbefore may offer universal application possibilities from the point of view of stimulation with different stimulating light sources. Different stimulating light sources that may be applied are those that have been described in Research Dislosure No. 308117, December 1989.

As preferred examples of stimulating light sources e.g. an argon-ion laser wherefrom the 488 nm or 514 nm line can be used, a He-Cd laser emitting at 442 nm and solid state (semiconductor) lasers having an emission below 500 nm or having a basic emission in the wavelength range of 880 to 1000 nm but operated with frequency doubling like the Nd-YAG laser and a He-Ne laser showing an emission peak at 633 nm may be recommended. In accordance with this invention blends can be made that are sensitive to stimulation by all these wavelengths.

A further important quality factor for the image storage panels made in accordance with this invention is the sharpness, which does not depend upon the degree of spread of the light emitted by the stimulable phosphor in the panel, but depends on the degree of spread of the stimulable rays in the panel. To reduce this spread of light a mixture can be made of coarser and finer batches to fill the gaps between the coated coarser phosphor particles. A better bulk factor may be attained by making a mixture of coarser and finer phosphor grains resulting in a loss in sensitivity unless the said phosphor grains are only slightly different in sensitivity. For intensifying screens this topic has already be treated much earlier by Kali-Chemie and has been patented in U.S. Pat. Nos. 2,129,295; 2,129,296 and 2,144,040.

If necessary a gradient of crystal sizes may be build up in the storage panel. Principally this may be possible by coating only one phosphor layer, making use of gravitation forces, but with respect to reproducibility at least two different phosphor layers comprising phosphors or phoshor mixtures in accordance with this invention may be coated in the presence of a suitable binder, the layer nearest to the support consisting essentially of small phosphor particles or mixtures of different batches thereof with an average grain size of about 5 µm or less and thereover a mixed particle layer with an average grain size from 8 to 20 µm for the coarser phoshor particles, the smaller phosphor particles optionally being present as interstices of the larger phosphor particles dispersed in a suitable-binder. Depending on the needs required the stimulable phosphors in accordance with this invention or mixtures thereof may be arranged in a variable way in these coating constructions.

In order to obtain a reasonable signal-to-noise ratio (S/N) the stimulation light has to be prevented from being detected together with the fluorescent light emitted on photostimulation of the storage phosphor. Therefore a suitable filter means is used preventing the stimulation light from entering the detecting means, e.g. a photomultiplier tube. Because the intensity ratio of the stimulation light is markedly higher than that of the stimulated emission light, i.e. differing in intensity in the range of $10^4:1$ to $10^6:1$ (see published EP-A 0 007 105 column 5) a very selective filter has to be used.

Suitable filter means or combinations of filters may be selected from the group of: cut-off filters, transmission bandpass filters and band-reject filters. A survey of filter types and spectral transmittance classification is given in SPSE Handbook of Photographic Science and Engineering, Edited by Woodlief Thomas, Jr.—A Wiley-Interscience Publication—John Wiley & Sons, New York (1973), p. 264–326.

Shortwave pass filters that transmit the shorter wavelengths and reject the longer wavelengths are listed in Table 4.12 of said SPSE Handbook.

Bandpass filters that transmit or reject only a limited band of wavelengths are listed in Tables 4.13 and 4.14 respectively. Tables of many selected long-wave, shortwave pass, and bandpass filters, both liquid and solid, for wavelengths from 150 to 3500 nm, are given by W. Summer, Photo Sensors, Chapman & Hall, London, 1957, chap. 9.

For example, a narrow bandpass filter SCHOTT BG3 (trade name) is used in the method according to the present invention.

For blocking the light of a narrow laser line holographic band-reject filters designed for Raman spectroscopy are used preferably. Such filters are described in the periodical Applied Spectroscopy, Volume 45, Number 5, 1991, p.765–770. Such filters are commercially available from Physical Optics Corporation, 20600 Gramercy Place, Suite 103, Torrance, Calif. 90501 under the name Raman Holographic Edge (RHE) filters. A filter for blocking selectively 488 nm laser light is commercially available in diameters of 1 or 2 inch identified by Part Number RHE 488.

In the catalogue (July 1990) of the company OMEGA OPTICAL INC. 3 Grove Street, PO Box 573, Brattleboro Vt. 05301 USA interference filters and coatings are described. From said catalogue can be learned that there are several types of said band-reject filters on the market. In one type described in said catalogue under the name RAMAN NOTCH (RN) SERIES filters high-performance rejection band filters consist of four precisely aligned interference filters arranged in a chevron baffle (see page 14 of the main catalogue) and are sealed in a rectangular housing.

The other type of rejection band filters described in said catalogue under the name OMEGA REJECTION BAND (RB) series filters attenuate the light of a spectral line or of a narrow spectral band and transmit wavelengths of light both longer and shorter than those in the band of rejection. RB series filters are useful where weak optical signals as is the case with the fluorescent light emitted on photostimulation of an X-ray irradiated phosphor are obscured by the relatively very high intensity of the stimulating laser light.

In the method according to the present invention the photostimulable phosphor is used preferably in dispersed state in a binder layer that may be supported or self-supporting and forms a screen or panel, called an X-ray image storage panel.

Suitable binders for forming a binder layer incorporating said phosphor in dispersed form are film forming organic polymers, e.g. a cellulose acetate butyrate, polyalkyl (meth)acrylates, e.g. poly(methyl methacrylate), a polyvinyl-n-butyral e.g. as described in the U.S. Pat. No. 3,043,710, a copoly(vinyl acetate/vinyl chloride) and a copoly(acrylonitrile/butadiene/styrene) or a copoly(vinyl chloride/vinyl acetate/vinyl alcohol) or mixture thereof.

An increase in the ratio amount of phosphor to binder as well as a reduction of the thickness of the coating layer is highly preferred to get a better sharpness provided that the sensitivity is not influenced. Otherwise a minimum amount of binder is preferably employed to obtain a high X-ray energy absorption. However, a very small amount of binding agent may result in too brittle a layer, so a compromise has to be made. The coverage of the phosphor is preferably in the range from about 300 to 1500 g/m2. The thickness of the phosphor layer is preferably in the range of 0.05 to 0.5 mm.

According to a preferred embodiment the phosphor layer is used as a support layer on a support sheet. Suitable support materials are made of a film forming organic resin, e.g. polyethylene terephthalate, but paper and cardboard supports optionally coated with a resin layer such as an alpha-olefinic resin layer are also particularly useful. Further glass and metal supports are used in certain circumstances, the latter preferably of high atomic weight, as described e.g. in U.S. Pat. Nos. 3,872,309 and 3,389,255, for use in industrial radiography (non-destructive testing).

According to a particular embodiment for industrial radiography the image-sharpness of the phosphor screen is improved by incorporating in the phosphor screen between the phosphor-containing layer and the support and/or at the rear side of the support a pigment-binder layer containing a non-fluorescent pigment being a metal compound, e.g. salt or oxide of lead, as described in Research Disclosure September 1979, item 18502.

For the preparation of the photostimulable phosphor screen the phosphor particles are intimately dispersed in a solution of the binder using an organic solvent, e.g. 2-methoxy propanol or ethyl acetate, and then coated on the support and dried. The coating of the present phosphor binder layer may proceed according to any usual technique, e.g. by spraying, dip-coating or doctor blade coating. After coating, the solvent(s) of the coating mixture is (are) removed by evaporation, e.g. by drying in a hot (60° C.) air current.

Solvent-less coating may be carried out by using UV or electron beam (EB) curable binder compositions as described e.g. in Research Disclosure December 1977, item 16435.

An ultrasonic treatment can be applied to improve the packing density and to perform the de-aeration of the phosphor-binder combination. Before the optional application of a protective coating the phosphor-binder layer may be calendered to improve the packing density (i.e. the number of grams of phosphor per $cm^3$ of dry coating).

Optionally, a light-reflecting layer is provided between the phosphor-containing layer and its support to enhance the output of light emitted by photostimulation. Such a light-reflecting layer may contain white pigment particles dispersed in a binder, e.g. titanium dioxide particles, or it may be made of a vapour-deposited metal layer, e.g. an aluminium layer, or it may be a coloured pigment layer absorbing stimulating radiation but reflecting the emitted light as described e.g. in U.S. Pat. No. 4,380,702.

Optionally a light-absorbing layer is provided between the phosphor-containing layer and its support or in the support itself to avoid reflection and scattering of light at the interface of the support and the phosphor-containing layer, thereby increasing the image resolution of the photostimulable phosphor screen.

Since in the above described X-ray recording system operating with photostimulable radiographic screens the screens are used repeatedly, it is important to provide them with an adequate topcoat for protecting the phosphor-containing layer from mechanical and chemical damage. This is particularly important for photostimulable radiographic screens where each screen normally is not encased in a cassette.

A protective layer can be coated onto the phosphor containing layer by directly applying thereto a coating solution containing a film-forming organic solvent-soluble polymer such as nitrocellulose, ethylcellulose or cellulose acetate or poly(meth)acrylic resin and removing the solvent by evaporation. According to another technique a clear, thin, tough, flexible, dimensionally stable polyamide film is bonded to the phosphor layer as described in published EP 392,474.

According to a further known technique a protective overcoat is produced with a radiation-curable composition. Use of a radiation curable coating as protective top layer in a X-ray conversion screen is described e.g. in EP 209,358 and JP 86/176900 and U.S. Pat. No. 4,893,021. For example, the protective layer comprises a UV cured resin composition formed by monomers and/or prepolymers that are polymerized by free-radical polymerization with the aid of a photoinitiator. The monomeric products are preferably solvents for the prepolymers used.

Further it may be very advantageous to protect the image storage panel with a protective layer having an embossed structure as has been described in EP-Applications 455 309 and 456 318.

According to a preferred embodiment the photostimulation of the phosphor-binder layer that has been image-wise or pattern-wise exposed with X-rays proceeds with a scanning laser beam. For use in combination with the phosphor screens according to the present invention preferably 488 nm light of an argon ion laser is used as photostimulating light.

The fluorescent light emitted by photostimulation is detected preferably photo-electronically with a transducer transforming light energy into electrical energy, e.g. a phototube (photomultiplier) providing sequential electrical signals that can be digitized and stored. After storage these signals can be subjected to digital processing. Digital processing includes e.g. image contrast enhancement, spatial frequency enhancement, image subtraction, image addition and contour definition of particular image parts.

According to one embodiment for the reproduction of the recorded X-ray image the optionally processed digital signals are transformed into analog signals that are used to modulate a writing laser beam, e.g. by means of an acousto-optical modulator. The modulated laser beam is then used to scan a photographic material, e.g. silver halide emulsion film whereon the X-ray image optionally in image-processed state is reproduced.

According to another embodiment the digital signals obtained from the analog-digital conversion of the electrical signals corresponding with the light obtained through photostimulation are displayed on a cathode-ray tube. Before display the signals may be processed by computer. Conventional image processing techniques can be applied to reduce the signal-to-noise ratio of the image and enhance the image quality of coarse or fine image features of the radiograph.

On phosphors useful in the method according to the present invention measurements have been carried out to determine their photo-physical properties.

The stimulation spectrum of the example materials was determined. The light of a tungsten (quartz-iodine) lamp is fed into a monochromator (Bausch and Lomb Germany) and then mechanically chopped with a rotating wheel with a single hole. The lamp provides a continuous spectrum extending from the near UV through the visible spectrum into the infrared. The 33-86-02 grating from Bausch and Lomb is a 1350 line/mm grating covering the visible range from 350 nm to 800 nm in the first order and is blazed at 500 nm. The wavelength of the stimulating light can be set via a step motor connected to the monochromator under the control of a computer. The second harmonic of the monochromator is eliminated by placing a 4 mm Schott GG435 filter in front of the phosphor screen. By chopping the stimulating light (duty cycle 1/200) only a small fraction of the absorbed energy in the phosphor is released. Only the AC signal is measured to eliminate the offset caused by e.g. the dark current of the photomultiplier. A good signal to noise ratio is obtained by averaging several pulses. Upon completing the measurement the computer corrects the curve for the intensity wavelength dependence of the tungsten lamp. The measurement can be repeated so that the evolution of the stimulation spectrum can be followed over a period of up to 15 hours.

The following examples illustrate the present invention without however limiting it thereto.

EXAMPLES

Example 1

First a raw mix was prepared with the emperical composition:

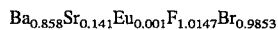

containing 0.08 wt. % of $Li_2CO_3$.

For this purpose a mixture of $BaF_2$, $SrF_2$ and $EuF_3$ and $Li_2CO_3$ in an amount of 1 kg were placed in a 1.5 l PE-bottle containing two 40 mm diameter agate balls. The bottle was shaken on a Turbula mixer for 30 minutes at 44 rpm and the required amount of $NH_4Br$ was added to the prepared mix. The whole contained in a 5 l PE-bottle was mixed again for 10 minutes on a jar rolling mill rotating at a speed of 41 rpm.

The obtained mixture was divided in fractions of 165 grams and each fraction was milled on a rotating ball mill in a 500 ml agate container in the presence of 15 agate balls of 20 mm diameter for 10 minutes at 290 rpm.

Finally the fractions were mixed again in a 5 l PE-bottle and the mixture was homogenized for 30 minutes in the presence of 8 agate balls of 40 mm diameter on a jar rolling mill rotating at 41 rpm.

A second raw mix was prepared with the same empirical composition but containing instead of $LiCO_3$ 0.3 wt. % of CsCl. Mixing and homogenization was performed in the same way as for the first raw mix.

Firing of both raw mixes happened in the same way. The first firing of 550 g batches took place in a tube furnace in a 100 % argon gas atmosphere at a gas flow rate of 72 l/h. The firing temperature was 850° C. and the firing time was 2 hours and 40 minutes.

Then the first raw mix that contained 0.08 wt. % of $Li_2CO_3$ was milled in such a way that the average particle size was ca. 5 µm. The second raw mix that contained 0.3 wt. % of CsCl was milled and classified. The fine fraction had a particle size of ca. 4 µm. This fine fraction was subjected to a second firing.

The second firing on 200 g batches was performed in a tube furnace, in a 99.8 % nitrogen gas and 0.2 % hydrogen gas atmosphere at a gas flow rate of 60 l/h. The firing temperature was 725° C. and the firing time was 4 h.

After firing the powders were ground in a mortar and pestle and sieved over a 37 µm mesh sieve.

The ground powders Li1 prepared in the presence of $LiCO_3$ and Cs1 prepared in the presence of CsCl were then seperately dispersed in a binder solution containing cellulose acetobutyrate dissolved in methyl ethyl ketone. The dispersions obtained were coated separately onto a 1002 µm thick transparent sheet of polyethylene terephtalate to give a dry coating weight of about 500 g/m².

In addition a blend was made of 80% by weight of the phosphor Li1 and 20% by weight of the phosphor Cs1.

A screen was made of the blend in the same way as for the component phosphors. The dried screens were used to determine the energy storage characteristics of the phosphors.

The stimulation spectra of the component phosphors Li1 and Cs1 and of the blend Li1+Cs1 were measured as described hereinbefore and are shown in FIG. 1. The position of the top in the stimulation spectrum clearly depends on the presence of Li or Cs. Phosphor Li1 has a maximum in the stimulation spectrum at about 532 nm, phosphor Cs1 has a maximum in the stimulation spectrum at 576 nm and the blend has a maximum in the stimulation spectrum at about 565 nm.

Example 2

A phosphor powder was synthesized in the presence of 0.3 wt. % of CsCl according to the procedure described in example 1. The resulting phosphor is called Cs2.

The stimulation spectrum of a screen made of phosphor Cs2 is shown in FIG. 2 and learns that although Cs2 was fired in the presence of 0.3 wt. % of CsCl as was phosphor Cs1 of example 1, its stimulation spectrum is different. This shows that although much care is taken to achieve very homogeneous mixing of the raw materials and to fire under constant conditions it is impossible to control the position of the maximum in the stimulation spectrum of the resulting product: Cs1 has a top in the stimulation spectrum at 576 nm; Cs2 has said top at 610 nm.

A blend of Li1+Cs2 was made of 17.5% of phosphor Li1 of example I and 82.5% of phosphor Cs2 and a screen made thereof shows the stimulation spectra as set forth in FIG. 2. This stimulation spectrum has a top at the same position as that of the blend Li1+Cs1 which proves that is possible to make a blend with a stimulation spectrum similar to that of blend Li1+Cs1 by choosing the amounts of the component phosphors Li1 and Cs2 in the right proportion.

The stimulation spectra of,the blends of example 1 and example 2 are very similar as has been shown in FIG. 2.

We claim:

1. Method of recording and reproducing a penetrating radiation image comprising the steps of:
   (i) causing stimulable storage phosphors to absorb said penetrating radiation having passed through an object or emitted by an object and to store energy of said penetrating radiation,
   (ii) stimulating said phosphors with stimulating light to release at least a part of said stored energy as fluorescent light and
   (iii) detecting the emitted fluorescent light, characterised in that said phosphors consist of a mixture of two or more individually prepared divalent europium doped bariumfluorohalide phosphors at least one of which contains (a) co-dopant(s) which co-determine(s) the character of the stimulation spectrum of the co-doped phosphor.

2. The method according to claim 1, wherein said mixture comprises at least two individually prepared divalent europium activated bariumfluorohalide phosphors, each of which has been prepared in the presence of at least one co-dopant the co-dopants for each being different from each other in chemical composition.

3. The method according to claim 2, wherein the co-dopants are members selected from the group consisting of Sm, Bi or alkali metals as e.g. Li, Na, K, Rb and Cs.

4. The method according to claim 2, wherein one of the individually prepared phosphors has Li as co-dopant and the other of the individually prepared phosphors has Cs as co-dopant.

5. Method according to claim 1, wherein said stimulating light is in the wavelength range from 750 nm to 440 nm.

6. Method according to claim 5, wherein the stimulation proceeds with 488 nm or 514 nm light of an argon ion laser.

7. Method according to claim 5, wherein the stimulation proceeds with 633 nm light of a He-Ne laser.

8. Method according to claim 1, wherein before detection of the light emitted by photostimulation the stimulating light is blocked substantially by a filter means.

9. The method for recording and reproducing penetrating radiation image according to claim 1, comprising at least one phosphor layer containing in a binder a mixture of two or more individually prepared divalent europium doped bariumfluorohalide phosphors at least one of which contains (a) co-dopant(s) which co-determine(s) the character of the stimulation spectrum of the co-doped phosphor.

10. The method according to claim 9, wherein said mixture of divalent europium activated bariumfluorohalide phosphors is prepared from the same raw mix to which the co-dopants are added after its preparation.

11. A stimulable phosphor member comprising a mixture of two or more individually prepared divalent europium doped bariumfluorohalide phosphors at least one of which contains (a) co-dopant(s) which co-determine(s) the character of the stimulation spectrum of the co-doped phosphor.

12. A stimulable phosphor member according to claim 11, wherein the co-dopants are members selected from the group consisting of Sm, Bi, or alkali metals as e.g. Li, Na, K, Kb and Cs.

* * * * *